United States Patent
Ashizawa

(10) Patent No.: US 6,339,627 B1
(45) Date of Patent: Jan. 15, 2002

(54) SYNCHRONIZATION DETECTOR CAPABLE OF DETECTING LOCATION OF FRAME WITHOUT SYNCHRONIZATION SIGNAL INCLUDED IN THE FRAME

(75) Inventor: Tetsuo Ashizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/096,170

(22) Filed: Jun. 12, 1998

(30) Foreign Application Priority Data

Jun. 13, 1997 (JP) ............................................. 9-156275

(51) Int. Cl.$^7$ ................................................ H04L 7/00
(52) U.S. Cl. ........................ 375/365; 375/366; 375/368; 714/765
(58) Field of Search ................................ 375/365, 366, 375/368; 714/775, 4, 765; 369/33, 48

(56) References Cited

U.S. PATENT DOCUMENTS

| RE33,665 E | * | 8/1991 | Ogawa ......................... 369/33 |
| 5,109,385 A | * | 4/1992 | Karp et al. .................. 714/775 |
| 5,621,773 A | * | 4/1997 | Varma et al. ................ 375/368 |
| 5,901,159 A | * | 5/1999 | Ichikawa ..................... 714/765 |
| 5,982,830 A | * | 11/1999 | Maturi et al. ............... 375/366 |

FOREIGN PATENT DOCUMENTS

| JP | 8-149418 | 6/1996 |
| JP | 8-289249 | 11/1996 |
| JP | 9-128907 | 5/1997 |

* cited by examiner

*Primary Examiner*—Steven Chin
*Assistant Examiner*—Shuwang Liu
(74) *Attorney, Agent, or Firm*—Foley & Lardner

(57) ABSTRACT

A synchronization detector has three registers to memorize individual patterns of three successive frames. A decoder produces a frame location signal on the basis of the individual patterns. A pointer circuit counts the number of the frame location signal to produce a pointer signal. The decoder produces a count-up signal when it can decode the individual patterns. The decoder produces a reset signal when it can not decode the individual patterns. A counter counts the count-up signal and is reset by the reset signal. A register holds a predetermined value. A comparator compares the count value of the counter with the predetermined value. The comparator produces a comparing order signal when the predetermined value is less than the count value. A comparing circuit compares the frame location signal with the pointer signal. If the frame location signal is not equal to the pointer signal, it happens that an optical head skips a few frames or slips to a next truck.

9 Claims, 3 Drawing Sheets

| SYNCHRONIZING SIGNAL | MAIN DATA | | |
|---|---|---|---|
| SY0 ( 0th) | | SY5 ( 1st) | |
| SY1 ( 2nd) | | SY5 ( 3rd) | |
| SY2 ( 4th) | | SY5 ( 5th) | |
| SY3 ( 6th) | | SY5 ( 7th) | |
| SY4 ( 8th) | | SY5 ( 9th) | |
| SY1 (10th) | | SY6 (11th) | |
| SY2 (12th) | | SY6 (13th) | |
| SY3 (14th) | | SY6 (15th) | |
| SY4 (16th) | | SY6 (17th) | |
| SY1 (18th) | | SY7 (19th) | |
| SY2 (20th) | | SY7 (21st) | |
| SY3 (22nd) | | SY7 (23rd) | |
| SY4 (24th) | | SY7 (25th) | |

SECTOR

FIG. 1

|  | INDIVIDUAL PATTERN | COMMON PATTERN |
|---|---|---|
| SY0 | A | |
| SY1 | B | |
| SY2 | C | |
| SY3 | D | |
| . | . | |
| . | . | |
| SY6 | G | |
| SY7 | H | |

SYNCHRONIZING SIGNAL

FIG. 2

SYNCHRONIZATION DETECTOR CAPABLE OF DETECTING LOCATION OF FRAME WITHOUT SYNCHRONIZATION SIGNAL INCLUDED IN THE FRAME

BACKGROUND OF THE INVENTION

This invention relates to a synchronization detector for detecting synchronization signals from frames that are included in a sector with a predetermined format.

Now, it is studied to digitize a video signal to store the digitized video signal into a memory medium, and to play back the digitized video signal memorized in the memory medium. Generally, the video signal is much larger than an audio signal in information amount. Accordingly, it is necessary that the memory medium has a very large capacity and can operate at high speed. In addition, it is necessary and indispensable to compress the video signal.

Since a digital versatile (or video) disk (DVD) is superior to a CD-ROM in quality of picture and playback time, it attracts considerable attention as the memory medium and is being realized. Moreover, JPEG (Joint Photographic Experts Group) and MPEG (Moving Picture Experts Group) 1 and 2 are known as the technique for compressing the video signal and for storing the video signal into the memory medium, such as the DVD. The JPEG is used for dealing with a still picture while the MPEG 1 and 2 are used for dealing with a moving picture.

Under these circumstances, a data format for the DVD is different from a data format for the CD-ROM. The data format for the DVD includes a sector comprising a predetermined digital signal unit. The sector is divided into a plurality of frames, for example, twenty-six frames. Each of the frames includes a synchronization signal together with a modulated digital video signal and error correction codes. The synchronization signal has thirty-two channel bits and has an individual pattern and a common pattern. The individual pattern is independent of other individual patterns included in other frames of the sector. For example, eight individual patterns are prepared for the sector. The common pattern is the same as in the other frames of the sector.

In a case that the digital video signal having the data format are played back, the synchronization signal located in the sector must be correctly reproduced to play back the digital video signal. Namely, a synchronization detector is very important for playing back the digital video signal.

If the synchronization detector make an error in detection for a head frame of the sector, the digital video signal will be incorrectly played back. Namely, when the synchronization signal of the head frame is incorrectly detected, an ID information can not be obtained. The ID information is added to a head of a sector, which comprises a plurality of the sectors and is a unit of error correction. Thus, it becomes difficult to play back the digital video signal in this case.

Moreover, if the synchronization detector make an error in detection for a middle frame of the sector, a reproduction track of the DVD deviates from correct track. Accordingly, the digital video signal is incorrectly played back in this case, too.

SUMMARY OF THE INVENTION

It is therefore an object of this invention to provide a synchronization detector which is capable of detecting a location of a frame when a synchronization signal included in the frame is not detected.

It is another object of this invention to provide a synchronization detector which is capable of detecting a head of a sector when a synchronization signal included in a head frame of the sector is not detected.

It is still another object of this invention to provide a synchronization detector which is capable of detecting a gap between an aimed reproduction track and a practical reproduction track.

Other object of this invention will become clear as the description proceeds.

On describing the gist of this invention, it is possible to understand that a synchronization detector detects synchronization signals from frames which are included in a sector with a predetermined format. The synchronization signals are located in the frames, respectively, with a predetermined order.

According to the gist of this invention, the synchronization detector comprises an extracting section which extracts the synchronization signals from the sector to produce extracted signals which are representative of the synchronization signals. A location detecting section is connected to the extracting section and detects locations of the frames on the basis of the extracted signals to produce frame location signals which are representative of the locations.

According to another gist of this invention, the extracting section has a register section to store at least three successive extracted signals. The location detecting section has a decoder to produce the frame location signal on the basis of relationship among the extracted signals stored in the register section, a pointer section for counting the number of the frame location signal to produce a frame number signal, and a comparing circuit for comparing the frame location signal with the frame number signal.

BRIEF DESCRIPTION OF THE DRAWING

FIG. 1 shows a predetermined data format for a sector of a DVD;

FIG. 2 shows a predetermined data structure for a synchronizing signal; and

DESCRIPTION OF THE PREFERRED EMBODIMENT

Figure 3:
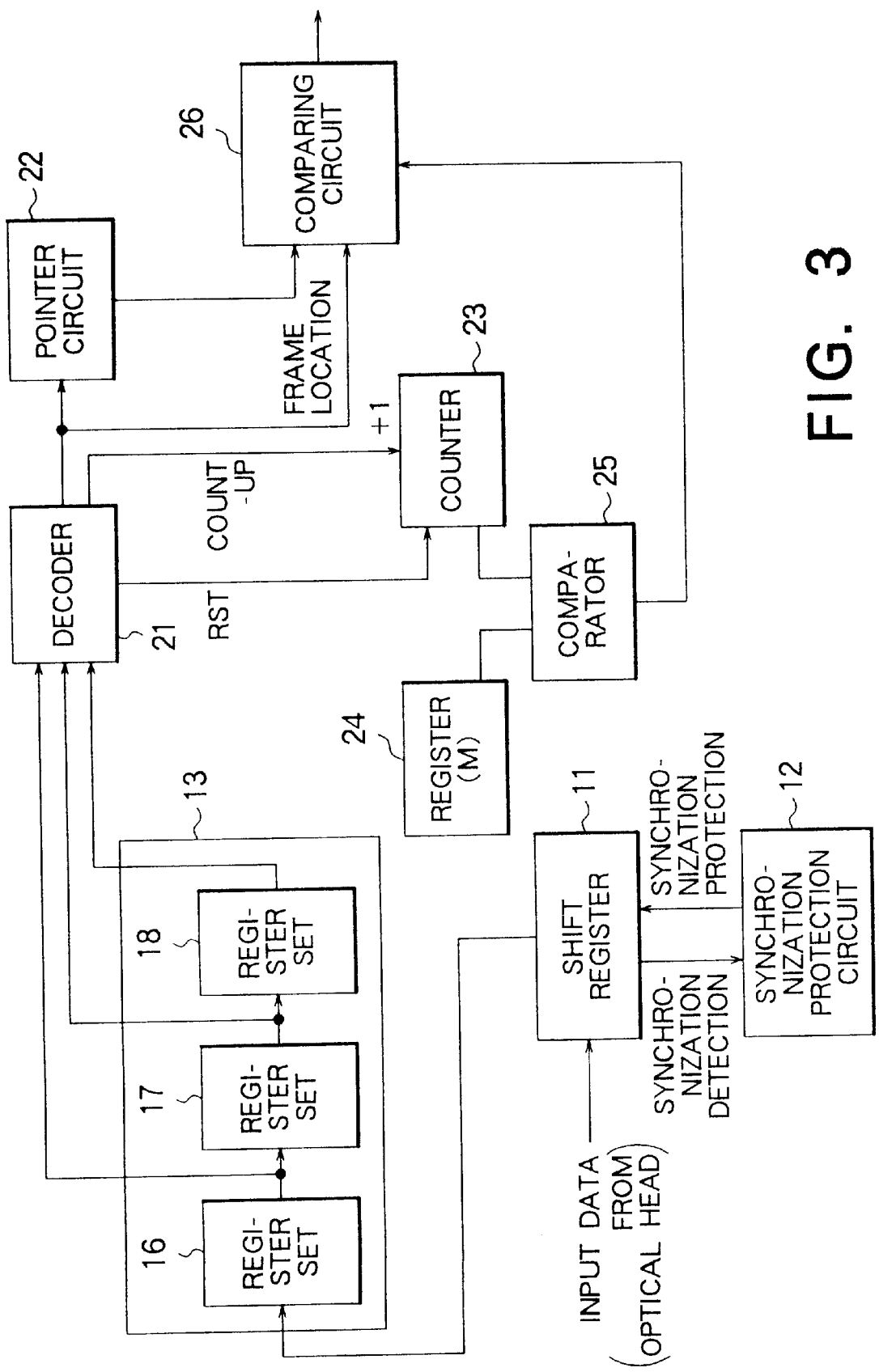
FIG. 3 is a block diagram of a synchronization detector according to a preferred embodiment of this invention.

Referring to FIGS. 1 through 3, the description will be made about a synchronization detector according to a preferred embodiment of this invention.

At first, a data format of a DVD (or DVD-ROM) is explained. The data format for a sector of the DVD is illustrated in FIG. 1. The sector is divided into twenty-six frames from a zeroth to twenty-fifth frames. Each of the frames has a synchronization signal section and a main data section. Any one of eight synchronization signals SY0–SY7 is assigned to the synchronization signal section. Namely, a head (or zeroth) frame has a zeroth synchronization signal SY0 in the synchronization signal section. A first frame has a fifth synchronization signal SY5 in the synchronization signal section. A second, a third, a fourth, a fifth, a sixth, a seventh, a eighth, a ninth, . . . , and a twenty-fifth frames have synchronization signals SY1, SY5, SY2, SY5, SY3, SY5, SY4, SY5, . . . , and SY7, respectively. Reading data from the sector is carried out in order of the frame number.

The synchronization signals SY0–SY7 have data structures, which are illustrated in FIG. 2. Namely, each of the synchronization signals SY0–SY7 has a thirty-two channel bits. In addition, each of the synchronization signals SY0–SY7 has a common pattern which is common to all of the synchronization signals SY0–SY7 and an individual pattern which is any one of the individual patterns A–H.

The main data section is used for digital video data and error correction codes. The digital video data and the error correction codes are sectored by a well-known method. The main data section is directly unrelated to this invention and will not be explained in details.

In FIG. 3, the synchronization detector comprises a shift-register 11 that receives input data such as illustrated in FIG. 1. The input data are sent from an optical head (not shown). The shift-register 11 stores the input data as stored input data.

A synchronization protection circuit 12 is connected to the shift-register 11 to keep watch the stored input data. The synchronization protection circuit 12 detects the common pattern from the stored input data to carry out a synchronization detection operation and a synchronization protection operation. The synchronization protection circuit 12 supplements the common pattern section by producing a new common pattern when it does not detect the synchronization signal in the stored input data.

A register section 13 is connected to the shift-register 11 and has first, second and third register sets 16, 17 and 18 to store three individual patterns of three successive frames. Each of the register sets 16, 17 and 18 has a plurality of registers.

The shift-register 11 picks out the individual pattern from the stored input data and sends the picked out pattern to the register section 13 every frame. When the first register set 16 receives a first picked out pattern sent from the shift-register 11, it stores the first picked out pattern. Next, the first register set 16 send the first picked out pattern to the second register set 17 when it receives a second picked out pattern sent from the shift-register 11 and stores the second picked out pattern. In this time, the second register set 17 stores the first picked out pattern. Next, the first register set 16 send the second picked out pattern to the second register set 17 when it receives a third picked out pattern sent from the shift-register 11 and stores the third picked out pattern. In this time, the second register set 17 stores the second picked out pattern and send the first picked out pattern to the third register set 17. The third register set 18 stores the first picked out pattern when the first picked out pattern is sent from the second register set 17. Therefore, the register section 13 stores the three picked out patterns of the three successive frames in order of input.

A decoder 21 is connected to the first, the second and the third register sets 16, 17 and 18. The decoder 21 receives the three picked out patterns when the register sets 16, 17, and 18 store the picked out patterns. The decoder 21 decodes the three picked out patterns to produce a frame location signal which is representative of a frame number of the last frame of the successive three frames. Namely, the decoder 21 produces the frame location signal when the three picked out patterns are given to it by prescribed order. For example, the decoder 21 decodes the picked out patterns of SY0, SY5 and SY1 in this order, it produces the frame location signal that represents the second frame. Moreover, the decoder 21 decodes the picked out patterns of SY4, SY7 and SY0 in this order, it produces the frame location signal that represents the zeroth frame. Such a decoder 21 can be easily obtained by the use of well-known art.

In addition, the decoder 21 produces a count-up signal whenever it decodes the three picked out patterns. The decoder 21 produces a reset signal RST when the three picked out patterns are given to it by irregular order.

A pointer circuit 22 is connected to the decoder 21 and receives the frame location signal. When the pointer circuit 22 receives the frame location signal for the first time, it holds the frame location signal as a pointer. Then, the pointer circuit 22 increases the pointer by one in synchronization with the frame location signal supplied from the decoder 21, independently of the content of the frame location signal. The pointer has a maximum value 25 and returns to zero when the pointer is increased by one from 25. Accordingly, the pointer represents the location of the frame that the optical head faces.

A counter 23 is connected to the decoder 21 and counts the count-up signal. The counter is reset by the reset signal RST.

A register 24, which is independent of the register section 13, memorizes a predetermined value M. For example, the predetermined value M is three, which is equal to the number of the registers in the register section 13.

A comparator 25 is connected to the counter 23 and the register 24 and compares a count value counted by the counter 23 with the predetermined value M memorized in the register 24 to produce a comparing order signal when the predetermined value M is not less than the count value.

A comparator 25 is connected to the counter 23 and the register 24 and compares a count value counted by the counter 23 with the predetermined value M memorized in the register 24 to produce a comparing order signal when the predetermined value M is less than the count value.

A comparing circuit 26 is connected to the decoder 21, the pointer circuit 22 and the comparator 25 to compare the frame location signal produced by the decoder 21 with the pointer supplied by the pointer circuit 22 when it receives the comparing order signal sent from the comparator 25.

In this structure, when the decoder 21 decodes M of successive picked out patterns, the comparing circuit 26 compares the pointer with the frame location signal. If the pointer is equal to the frame location signal, the synchronization detector correctly detects the synchronizing signal. On the other hand, if the pointer is not equal to the frame location signal, the synchronization detector fails to detect the synchronizing signal. Namely, the optical head skips over a few frames or slides to a next track.

If the reset signal is supplied to the counter 23, the comparing circuit 26 does not compare the pointer with the frame location signal until the count value becomes M. In this situation, it can be considered that the pointer represents the frame that the optical head faces.

The operations of the counter 23, comparing circuit 26 and the pointer circuit 22 will be mentioned in more detail.

It is assumed that the pointer is equal to five and the predetermined value M is equal to three.

When the counter value of the counter 23 is not less than the predetermined value M, the comparing circuit 26 compares the pointer held by the pointer circuit 22 with the frame location signal produced by the decoder 21. If the optical head does not skip over a few frames or does not slide to a next track, the pointer is equal to the frame location signal.

If the decoder 21 fails to decode a picked out pattern of a next frame, the decoder supplies the reset signal RST to the counter 23. As a result, the comparing circuit 26 stops comparing the pointer with the frame location signal until the decoder 21 correctly decodes three successive picked out patterns. On the other hand, the pointer circuit 22 increases the pointer, because the pointer circuit 22 is not influenced by the content of the flame location signal.

When the decoder 21 correctly decodes the three successive picked out patterns, the comparing circuit 26 compares the pointer with the frame location signal again. In this time, if the pointer is equal to the frame location signal, the optical head does not skip and does not slide. On the other hand, when the pointer is not equal to the frame location signal, the optical head skips over a few frames or slides to the next truck.

As mentioned above, the synchronization detector uses a plurality of individual patterns to detect synchronization signals. This enables the synchronization detector to detect the location of the frame even if the decoder does not decode their individual pattern. For example, even if the individual pattern of the first frame is not decoded by the decoder, the location of the first frame can be decided by the use of the second through fourth frames.

Moreover the synchronization detector can easily detect the skip and the slide of the optical head by the use of the comparing result of the comparing circuit 26. While this invention has thus for been described in conjunction with preferred embodiment thereof, it will readily be possible for those skilled in the art to put this invention into practice in various other manners. For example, the register section 13 may have N (N≧4) registers. In this case, the predetermined value M must not less than N. For example, if the resister section 13 has five registers, the predetermined value M must not less than five.

What is claimed is:

1. A synchronization detector for detecting synchronization signals from frames included in a sector with a predetermined format, the synchronization signals located in the frames, respectively, with a predetermined order, the synchronization signal in each frame including an individual pattern that is different from frame to frame, said synchronization detector comprising:

extracting means for extracting the individual patterns of the synchronization signals from the sector to produce extracted signals which are representative of the synchronization signals, and location detecting means connected to said extracting means for detecting a frame location of one of the frames in the sector on the basis of the extracted signals to produce a frame location signal which is representative of the frame location in the sector; and wherein said location detecting means counts the number of the frame location signal to produce a frame number signal, and wherein said synchronization detector further comprises;

slip detecting means connected to said location detecting means for comparing the frame location signal with the frame number signal to decide slip of frame location.

2. A synchronization detector as claimed in claim 1, wherein said extracting means has a register section to store at least three successive extracted signals, and said location detecting means having a decoder to produce the frame location signal on the basis of relationship among the extracted signals stored in said register section.

3. A synchronization detector as claimed in claim 1, wherein said extracting means has synchronization signal detecting means for detecting existence of the synchronization signals in the frames and protection means for supplementing the synchronization signals.

4. A synchronization detector as claimed in claim 1, wherein each of the frames includes data.

5. A synchronization detector as claimed in claim 4, wherein the predetermined format is for a digital versatile disk.

6. A synchronization detector as claimed in claim 5, wherein said extracting means has a register section to store at least three successive extracted signals, and said location detecting means having a decoder to produce the frame location signal on the basis of relationship among the extracted signals stored in said register section, a pointer section for counting the number of the frame location signal to produce a frame number signal, and a comparing circuit for comparing the frame location signal with the frame number signal.

7. A synchronization detector as claimed in claim 6, wherein said decoder produces a count-up signal whenever it detects the synchronization signal, and produces a reset signal when it does not detect the synchronization signal.

8. A synchronization detector as claimed in claim 7, said synchronization detector further comprising:

a counter connected to said decoder for counting the count-up signal and for being reset by the reset signal, a register for holding a predetermined value, and a comparator connected to both of said counter and said register for comparing the count value counted by said counter with the predetermined value to produce a comparing order signal, the comparing order signal driving said comparing circuit.

9. A synchronization detector as claimed in claim 8, wherein said register section has predetermined stages of the registers, said predetermined stages being equal to the predetermined value.

* * * * *